(12) United States Patent
Arnelöf

(10) Patent No.: US 10,018,259 B2
(45) Date of Patent: Jul. 10, 2018

(54) GEARBOX FOR VEHICLES AND VEHICLES COMPRISING SUCH A GEARBOX

(71) Applicant: SCANIA CV AB, Södertälje (SE)

(72) Inventor: Per Arnelöf, Haninge (SE)

(73) Assignee: Scania CV AB, Södertälje (SE)

(*) Notice: Subject to any disclaimer, the term of this patent is extended or adjusted under 35 U.S.C. 154(b) by 45 days.

(21) Appl. No.: 15/310,953

(22) PCT Filed: May 25, 2015

(86) PCT No.: PCT/SE2015/050596
§ 371 (c)(1),
(2) Date: Nov. 14, 2016

(87) PCT Pub. No.: WO2015/183159
PCT Pub. Date: Dec. 3, 2015

(65) Prior Publication Data
US 2017/0089437 A1    Mar. 30, 2017

(30) Foreign Application Priority Data

May 27, 2014 (SE) .................................. 1450626
May 27, 2014 (SE) .................................. 1450627
May 25, 2015 (SE) .................................. 1550665

(51) Int. Cl.
F16H 3/50 (2006.01)
F16H 37/04 (2006.01)
F16H 3/44 (2006.01)

(52) U.S. Cl.
CPC ............. *F16H 37/042* (2013.01); *F16H 3/50* (2013.01); *F16H 2003/447* (2013.01);
(Continued)

(58) Field of Classification Search
CPC ............... F16H 37/42; F16H 2200/034; F16H 2003/447; F16H 2200/2005; F16H 2702/02; F16H 2037/049; F16H 2037/028
(Continued)

(56) References Cited

U.S. PATENT DOCUMENTS 2,686,978 A  8/1954  Herbster
2,941,423 A  6/1960  Armington et al.
(Continued)

FOREIGN PATENT DOCUMENTS

CN  201053478 Y  4/2008
DE     412709 C  9/1925
(Continued)

OTHER PUBLICATIONS

International Search Report for PCT/SE2015/050596 dated Sep. 21, 2015.
(Continued)

*Primary Examiner* — Roger L Pang
(74) *Attorney, Agent, or Firm* — Moore & Van Allen PLLC; W. Kevin Ransom

(57) ABSTRACT

The invention relates to a gearbox for vehicles, comprising a planetary gear with a ring gear a sun gear and a planet carrier on which at least one planet gear is rotatable mounted, which ring gear and sun gear engages with the at least one planet gear by teeth; and a gearbox housing surrounding the planetary gear. A first axially movable coupling sleeve is in a first gear position arranged to engage the ring gear with the gearbox housing in a second gear position arranged to engage the sun gear with the planet carrier and in a third gear position arranged to engage the planet carrier with the gearbox housing. A second axially movable coupling sleeve is in the third gear position arranged to engage the ring gear with an output shaft. The
(Continued)

invention also relates to a vehicle, which comprises such a gearbox.

20 Claims, 9 Drawing Sheets

(52) U.S. Cl.
CPC .................. *F16H 2037/049* (2013.01); *F16H 2200/0034* (2013.01); *F16H 2200/2005* (2013.01); *F16H 2702/02* (2013.01)

(58) Field of Classification Search
USPC .................................................. 475/296, 286
See application file for complete search history.

(56) References Cited

U.S. PATENT DOCUMENTS

| | | | |
|---|---|---|---|
| 3,477,314 A | 11/1969 | Rutkowski | |
| 3,686,978 A | 8/1972 | Knoblach et al. | |
| 4,215,593 A * | 8/1980 | Shono | B60K 17/3462 475/204 |
| 4,805,484 A * | 2/1989 | Hiraiwa | B60K 17/3467 180/247 |
| 5,968,849 A | 10/1999 | Bello et al. | |
| 6,196,944 B1 | 3/2001 | Schmitz | |
| 6,406,400 B1 | 6/2002 | Shih | |
| 9,085,227 B2 * | 7/2015 | Fournier | B60K 6/445 |
| 2007/0042854 A1 | 2/2007 | Edelson | |
| 2008/0032846 A1 | 2/2008 | Heinzelmann | |
| 2010/0267508 A1 | 10/2010 | Hvolka et al. | |
| 2012/0088628 A1 | 4/2012 | Ziemer et al. | |
| 2014/0011618 A1 | 1/2014 | Atarashi et al. | |
| 2014/0046555 A1 | 2/2014 | Slapak | |
| 2014/0162825 A1 | 6/2014 | Sugimoto | |
| 2015/0226297 A1 | 8/2015 | Knoblauch et al. | |
| 2016/0003351 A1 | 1/2016 | Park | |
| 2017/0089429 A1 | 3/2017 | Slapak | |
| 2017/0089437 A1 | 3/2017 | Arnelöf | |

FOREIGN PATENT DOCUMENTS

| | | |
|---|---|---|
| DE | 1153633 B | 8/1963 |
| DE | 4121709 A1 | 1/1992 |
| FR | 1360006 A | 4/1964 |
| GB | 1045972 A | 10/1966 |
| GB | 1294548 A | 11/1972 |
| GB | 2081824 A | 2/1982 |
| GB | 2103735 A | 2/1983 |
| JP | 61002954 A | 1/1986 |
| SE | 439969 B | 7/1985 |
| WO | 0155620 A1 | 8/2001 |
| WO | 2014005774 A1 | 1/2014 |

OTHER PUBLICATIONS

Written Opinion of the International Search Authority for PCT/SE2015/050596 dated Sep. 21, 2015.
Supplementary European Search Report for EP15799107 dated Dec. 18, 2017.

* cited by examiner

GEARBOX FOR VEHICLES AND VEHICLES COMPRISING SUCH A GEARBOX

CROSS-REFERENCE TO RELATED APPLICATION(S)

This application is a national stage application (filed under 35 § U.S.C. 371) of PCT/SE2015/050596, filed May 25, 2015 of the same title, which, in turn claims priority to Swedish Application Nos. 1450626-5, filed May 27, 2014, 1450627-3, filed May 27, 2014, and 1550665-2, filed May 25, 2015, all of the same title; the contents of each of which are hereby incorporated by reference.

FIELD OF THE INVENTION

The present invention relates to a gearbox for vehicles and a vehicle comprising same.

BACKGROUND OF THE INVENTION

In vehicles, and especially for heavier vehicles such as trucks, a gearbox, also called range gearbox, is often connected the main gearbox to double the number of gears. Such an auxiliary gearbox usually includes a planetary gear, which has a low gear and a high gear, wherein the main gearbox shift facilities can be divided into a low range gear position and a high range gear position. In low range gear a downshift takes place through the planetary gear, and in the high range gear the gear ratio is 1:1 in the planetary gear.

The range gearbox is usually provided between the main gearbox and a propeller shaft coupled to the drive wheels of the vehicle. The range gearbox is accommodated in a gearbox housing and comprises an input shaft coupled to the main gearbox, an output shaft and between the input shaft and the output shaft is the planetary gear disposed. The planetary gear usually comprises three components, which are rotatable arranged relative to each other namely a sun gear, a planet carrier with planet gears and a ring gear. With knowledge of the number of teeth of the sun gear and the ring gear the relative speed of the three components can be determined during operation. In a range gearbox the sun gear can be rotatable connected to the input shaft, a number of planet gears which engage said sun gear, which planet gears are rotatable mounted on the planet carrier which is fixedly connected to the output shaft, and an axially displaceable ring gear which surrounds and engages the planet gears. The teeth of the sun gear, planet gears and ring gear can be helical, that is, they have an angle to a common rotation axis of the sun gear, planet carrier and ring gear. By cutting the teeth of the gears in an angle in relation to the rotation axis of the gear, the generated sound from the planetary gear is reduced. However, due to the helical teeth a reaction force arises from the gears in the planetary gear in the direction of the rotation axis. The direction of the reaction force depends on the direction in which the gears of the planetary gear are helical. Thus, the reaction force is directed backward or forward in the extension of the rotation axis.

In a known range gearbox the low range gear position and high range gear position are obtained by displacing the ring gear axially between the low range gear position, in which the ring gear is rotationally locked relative to the gearbox housing, and high range gear position in which the ring gear is rotatable relative to the gearbox housing and where the ring gear, the planet gears and the sun gear rotate as a common unity. The planetary gear comprises two on each side of the ring gear arranged coupling rings and two synchronizing rings arranged on each side of the ring gear. Synchronizer rings is to provide a synchronous shift.

In order to obtain a good synchronization function in this type of range gearbox, the surface of the synchronizer ring teeth, which faces the ring gear and which is intended to receive the ring gear teeth during synchronization, may be provided with an angle, called locking angle, relative to the axis of rotation of the synchronizer ring, which locking angle must be balanced against the braking torque the synchronizer ring transmits. This means that said locking angle must be so designed that the teeth of the synchronizing ring abuts on the part of the ring gear teeth which are provided with the locking angle and impact sufficiently on the ring gear so that synchronous speed can be obtained, and thereafter be detached from the part of the ring gear teeth, which are provided with locking angle, so that the ring gear can engage with the current coupling ring when the synchronous speed is obtained. To ensure that a synchronous speed is achieved before the ring wheel slip past the synchronizer ring in the axial direction, the teeth of the synchronizing ring must be so designed that they do not release the ring gear teeth too easy.

When the teeth of the synchronizing ring have been disengaged from the ring gear teeth and the synchronous speed has been obtained between the ring gear and the coupling ring, the ring gear will be further axially displaced so that the synchronizer ring is moved inwardly in the ring gear and stop in an axial position relative to the ring gear, which axial position is determined by the position where the synchronizing ring hits and abuts against the planet wheels of the planetary gear.

The freedom of movement in the axial direction of the ring gear is limited by the geometrical design of the ring gear and the teeth of the coupling ring. When the ring gear hits the axial end positions the tips of the teeth of the ring wheel abut a circumferential end face of each coupling ring. This means that the ring gear can no longer be displaced in the axial direction.

The document WO0155620 discloses a synchronization device in a planetary gear in which the planetary gear includes a sun gear, a planet carrier and a ring gear. The sun gear is rotatable connected with the input shaft and a number of planet gears engaging with the sun gear, which planet gears are rotatable mounted on the planet carrier, which is connected to the output shaft. An axially displaceable ring gear surrounds and meshes with the planet gears. Low and high gear are obtained by the ring gear being displaced axially between low range gear and high range gear.

These synchronization means are subject to wear and are costly to repair. If the range gearbox shall transmit large torque, these synchronization devices must exhibit considerable dimensions, which results in increased weight, increased space requirements and an increased moment of inertia. When the high range gear is engaged, the torque is transmitted from the sun gear to the planet gears, which means that facets may be formed on the tooth flanks of sun gear, which creates noise in the gearbox and accelerates the wear of the gears of the planetary gear.

There are range gearboxes in which the synchronization devices are replaced with coupling sleeves provided with splines. By controlling the transmission to synchronous speed between the two components to be assembled an axial displacement of the coupling sleeve along the two components is made possible in order to connect them. When the components should be detached the transmission is controlled so that torque balance occurs between the components so that the coupling sleeve is not transmitting torque.

It then becomes possible to move the coupling sleeve along the components in order to disengage them from each other.

The torque balance is a condition where a torque acting on the ring gear, corresponding to the product of the torque acting on the planet carrier and the gear ratio of the planetary gear while a torque acts on the sun gear, corresponding to the product of the torque acting on the planet carrier and (1−[the gear ratio of the planetary gear]). In the case that two of the components of the planetary gear, sun gear, ring gear or planet carrier are coupled together by a coupling sleeve, the coupling sleeve transmits no torque between the planetary gear elements when torque balance occurs. Thus, the coupling sleeve can be easily displaced and the planetary gear components released.

U.S. Pat. No. 6,196,944 shows a planetary gear comprising a sun gear, a planet carrier with planet gears and a ring gear. The sun gear may be connected to the input shaft by means of a coupling sleeve in a low range gear position and disengaged from the input shaft in a high range gear position. In the high range gear position the input shaft is connected to of the planet carrier by means of the same coupling sleeve. The ring gear is firmly connected to a gearbox housing. The known planetary gear is arranged in an auxiliary gearbox, having only two gear positions.

The reverse gear in a transmission in a vehicle are often arranged in the main gearbox, which then comprises a gear which is engaged when the vehicle is to be driven in the reversed direction. The gear wheel, which is intended for the reverse gear, causes an elongation of the main gearbox, and an undesired increase in weight of the vehicle. The reverse gear wheel rotates in the opposite direction to the other gears in the main gearbox, which causes losses. Said gear wheel which is intended for the reverse gear has a tendency to produce undesirable noise in the transmission, which is a result of an intermediate gear wheel disposed between a lay shaft and a main shaft in the main gearbox.

U.S. Pat. No. 6,196,944 shows a gearbox for motor vehicles comprising a planetary gear comprising a first and a second sleeve acting on the planet carrier, the ring gear, the gearbox housing and the output shaft. The first and second sleeves are controlled as one connected unit.

The known transmissions often requires complete disassembly for replacement of a component, which means that it takes much time and it becomes costly to repair the gearbox.

BRIEF SUMMARY OF THE INVENTION

Despite the known solutions there is a need to further develop a gearbox in which the time for shifting is short, where reliability and operational safety of the gearbox is high, and where all components in the gearbox are utilized effectively so that low energy is required when shifting. There is also a need to develop a gearbox, which exhibits small dimensions relative to the possible transmission of torque and a gearbox with low axial forces acting on the main shaft bearings in the main gearbox. There is also an effort to reduce the fuel consumption of a vehicle, which includes a gearbox and reducing noise from the gearbox as well as a need to further develop a gearbox that is easy to repair. There is also a need to develop a gearbox which eliminates the disadvantages of a reverse gear in the transmission main gearbox. Also, there is a need to develop a gearbox which brings the overall components in the gearbox to a minimum in order to save manufacturing and maintenance costs.

The object of the present invention is to provide a gearbox which brings the overall components in the gearbox to a minimum in order to save manufacturing and maintenance costs.

Another object of the present invention to provide a gearbox in which the reliability and operational safety of the gearbox is high.

A further object of the invention to provide a gearbox that utilizes all of the transmission components effectively.

A further object of the invention is to provide a gearbox, having small dimensions in relation to possible transmission of torque.

A further object of the present invention is to provide a gearbox in which the time for shifting is short.

A further object of the invention is to provide a gearbox which is simple to repair.

A further object of the invention is to provide a gearbox which reduces the fuel consumption of a vehicle, comprising the gearbox.

A further object of the present invention is to provide a gearbox which requires low energy for shifting.

A further object of the present invention is to provide a transmission, which eliminates the drawbacks with a reverse gear in the main gearbox.

A further object of the invention is to provide a gearbox which generates low noise.

A further object of the invention is to provide a gearbox with low axial forces acting on main shaft bearings in a main gearbox.

According to the invention a reverse gear in the power train is achieved in the third gear position when the first axially movable coupling sleeve is arranged to engage the planet carrier with the gearbox housing and the second axially movable coupling sleeve is arranged to engage the ring gear with the output shaft. Such a reverse gear results in an increased efficiency with lower losses. The third gear position can be easily shifted by controlling the first and second axially displaceable coupling sleeves to the third gear position, corresponding to the reverse gear. When the gearbox according to the invention is arranged in the transmission of a vehicle the traditional reverse gear in the main gearbox can be excluded, thus saving weight, space and fuel. The main shaft in the main gearbox can be designed with a shorter length since the reverse gear can be deleted. Thus, the main shaft will exhibit less deflection when transmitting torque, which means that the life time of the bearings for the main shaft increases. Since the reverse gear is moved to the range gearbox, the number of reverse gears in the transmission increases. The number of reverse gears will thus correspond with the number of gears in the main gearbox.

Since the first axially displaceable coupling sleeve transmits torque from the input shaft to the planet wheel carrier and further to the output shaft in the second gear position and the first axially displaceable coupling sleeve locks the ring gear with the gear housing so that torque is transmitted from the input shaft via the ring gear and the planet carrier to the output shaft in the first gear position, a gearbox with high efficiency and low losses is achieved. The gearbox will exhibit a reduced need for lubrication while the impact of facet damages of the tooth flanks are minimized.

The axial stroke of the respective coupling sleeve is shorter compared with the stroke length of the ring wheel of a traditional range gearbox, which means that it is possible to quickly switch between different gear positions.

The first coupling sleeve can be performed with a limited longitudinal extent, causing the weight of the coupling sleeve to be low. The low mass of the coupling sleeve means that it is possible to quickly switch between different gear positions.

According to one embodiment of the invention, the second axially movable coupling sleeve may in the second gear position be arranged to engage the ring gear with the output shaft. This position of the second axially movable coupling sleeve in the second gear position may be used as an alternative to a position where the second axially movable coupling sleeve in the second gear position is arranged to engage the planet carrier with the output shaft. When the second axially movable coupling sleeve in the second gear position is arranged to engage the ring gear with the output shaft, torque will be forwarded via the sun gear and the planet gears which may increase the possibility of facet damages of the tooth flanks. Thus, such a position of the second axially movable coupling sleeve in the second gear position preferably only should be used as an alternative in for example a limp home mode.

According to one embodiment of the invention, the gearbox comprises an axial stop which is rotatable with bearings on the planet carrier and is attached to the ring gear. The axial stop prevents the ring gear from being be displaced axially. Thus, the axial position of the ring gear is fixated and the gears of the planetary gear can be provided with either straight-toothed or helical-toothed gears.

According to one embodiment of the invention, the input shaft is connected to sun gear, and the planet carrier is connected to an output shaft of the gearbox. Thus the gearbox exhibits a simple design with few components.

According to one embodiment of the invention, the input shaft is connected to the sun gear with a spline connection, which has an axial extent which permits an angular displacement between the input shaft and the sun gear axis. In operation, the main shaft in the main gearbox will in certain operating situations be curved. The allowable angular displacement in the spline connection leads to that the sun gear will not be affected by the bending of the main shaft, which reduces stresses in the teeth of the sun gear.

According to one embodiment of the invention, the spline connection is designed to let the planetary gear be fitted and removed in one piece on the input shaft. Thus, the maintenance costs can be reduced because the time required for the repair of the gearbox decreases.

According to one embodiment of the invention, the first axially displaceable coupling sleeve is on an inner surface provided with first splines which are arranged to cooperate with corresponding first splines arranged on the gearbox housing, the input shaft, the planet carrier and the ring gear. A simple and efficient connection and disconnecting of the gearbox housing and the ring gear, the input shaft and the ring gear, and the gearbox housing and the planet carrier, respectively, is achieved.

According to one embodiment of the invention, the number of splines on the first sleeve differs from the number of teeth on the ring gear. Thus, a large number of discrete locked positions between the first coupling sleeve and the ring gear are obtained, which minimizes the negative effect of facets on the teeth in that a large number of facets may be formed on the tooth flanks of the gears. However, the facets will lie close together, so that they together will experience as a substantially smooth surface of the tooth flanks. The optimum number of splines can be calculated to obtain as many facets as possible. According to the invention the planetary gear tooth flanks are not subjected to high stresses in the second shift position, which minimizes the risk of formation of facets.

According to one embodiment of the invention the ring gear, the sun gear and the at least one planet gear are formed with oblique teeth which extend in an angle in relation to the respective gear centre axis. Thus a gearbox with high torque transmission and low noise level is obtained.

Further advantages of the invention appear from the following detailed description.

BRIEF DESCRIPTION OF THE DRAWINGS

Below is a description of, as examples, preferred embodiments of the invention with reference to the enclosed drawings, in which.

DETAILED DESCRIPTION OF THE INVENTION

Figure 1:
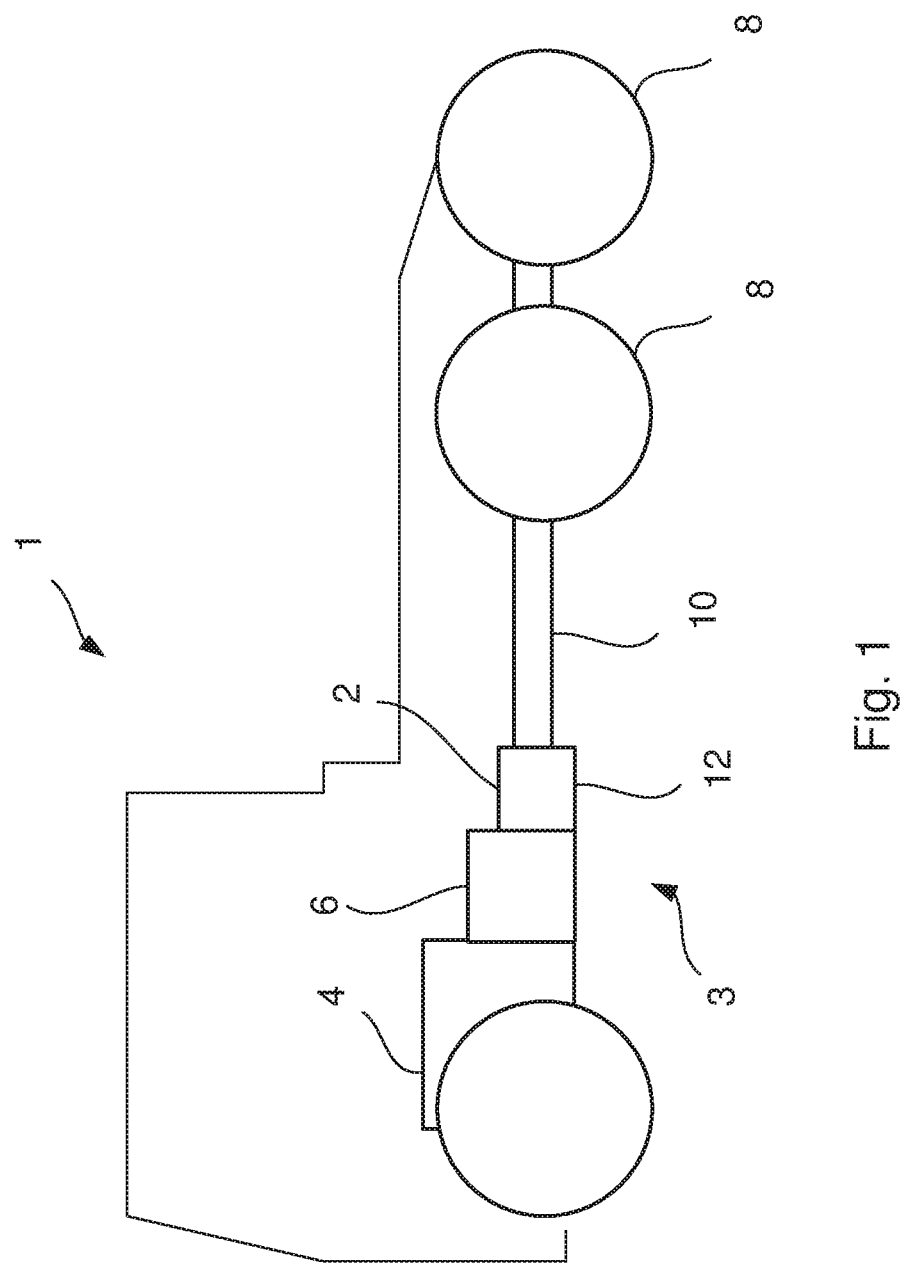
FIG. 1 shows schematically a vehicle in a side view with a gearbox according to the invention.

FIG. 1 shows schematically a vehicle 1 in a side view with a gearbox 2 according to the invention. The gearbox 2 is included in a transmission 3, which comprises an internal combustion engine 4, a main gearbox 6 and a propeller shaft 10. The combustion engine 4 is coupled to the main gearbox 6, which in turn is connected to the gearbox 2 of the present invention. The gearbox 2 is further connected to the drive wheels 8 of the vehicle 1 via the propeller shaft 10. The gearbox 2 of the present invention is a range gearbox, and aims to double the number of gear opportunities. The gearbox 2 is surrounded by a gearbox housing 12.

Figure 2:
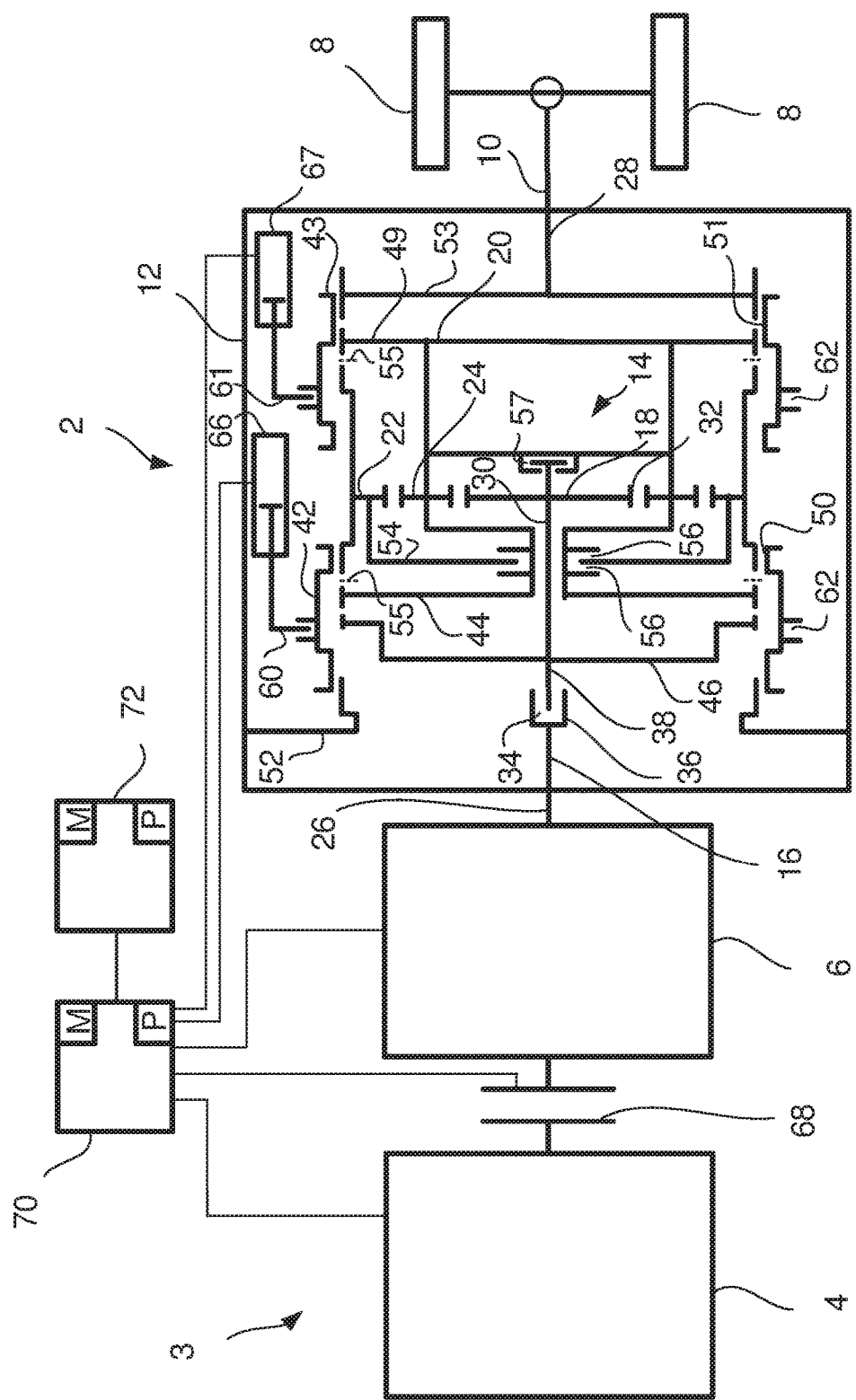
FIG. 2 shows schematically a cross section of the gearbox according to the invention in a low range gear position.

FIG. 2 shows a schematic sectional view of a gearbox 2 of the present invention. The gearbox 2 comprises a planetary gear 14 which has a low and a high gear, so that the switching capability of the main gearbox 6 can be divided into a low range gear position and a high range gear position. In a first gear position corresponding to the low range gear position a downshift takes place in the planetary gear 14. In the high range gear position the gear ratio is 1:1 in the planetary gear 14. FIG. 2 shows the gearbox 2 in the first gear position, corresponding to the low range gear position.

The gearbox 2 is accommodated in the gearbox housing 12 and comprises an input shaft 16 which may be a main shaft 26 of the main gearbox 6. The planetary gear 14 comprises three main components which are rotatable arranged in relation to each other, namely a sun gear 18, a planet carrier 20 and a ring gear 22. A number of planet gears 24 are rotatable arranged with bearings on the planet carrier 20. With knowledge of the number of teeth 32 of sun gear 18 and the ring gear 22, the relative gear ratio of the three components can be determined. The sun gear 18 is rotatable connected to the input shaft 16 and the planet gears 24 engage the sun gear 18. The ring gear 22 surrounds and engages the planet gears 24. The teeth 32 of the sun gear 18, the planet gears 24 and the ring gear 22 can be bevelled, so that they have an angle relative to a common axis of rotation 30 of the sun gear 18, the planet gear carrier 20 and the ring gear 22. By cutting the teeth 32 in a sloping angle, a reaction force is obtained from the gears 18, 22, 24 in the planetary gear 14 in the direction of axis of rotation 30. The direction of the reaction force depends on the direction in which the teeth 32 of the planetary gear 14 are bevelled. Thus, the reaction force can be directed backward or forward in the axis of rotation 30.

The input shaft 16 is preferably connected to the sun gear 18 by means of a splines connection 34 which has an axial extent which allows an angular displacement between the input shaft 16 and the shaft 38 of the sun gear 18. In operation main shaft 26 in the main gearbox 6 will under certain operating condition and great stress bend or curve due to its elasticity and resilient properties. The main shaft 26 will return to its original shape when the load on the main shaft 26 decreases. The input shaft 16 is at its end provided with a sleeve 36, which internally cooperates with the circumference of a portion of the shaft 38 of the sun gear 18 by mean of the splines connection 34. The permissible angle displacement in the splines connection 34, results in that the sun gear 18 is not affected by the bending of the main shaft 26, which reduces stresses on the sun gear 18 teeth 32. The splines connection 34 is preferably designed such that the planetary gear 14 can be assembled and disassembled in one piece on the input shaft 16. Thus, the maintenance costs are reduced, since the time required for the repair decreases.

A first axially displaceable engaging sleeve 42 is in a first gear position arranged to connect the transmission case 12 with the ring gear 22 and in a second gear position arranged to disconnect the transmission case 12 from the ring gear 22. The first axially movable coupling sleeve 42 is in the first gear position arranged to disconnect the input shaft 16 from the planet carrier 20.

A second axially displaceable engaging sleeve 43 is in a third gear position arranged to couple the ring gear 22 with an output shaft 28 of the gearbox 2. The output shaft 28 is coupled to the propeller shaft 10 of the vehicle 1. In the third gear position, corresponding to a reverse gear, the first axially displaceable coupling sleeve 42 is arranged to disconnect the input shaft 16 from the planet carrier 20 and instead is arranged to interconnect the planet carrier 20 with the gearbox housing 12. In the first and second gear positions the second axially displaceable coupling sleeve 43 is arranged to interconnect the planet carrier 20 with the output shaft 28.

The first axially displaceable coupling sleeve 42 is on an inner surface provided with first splines 50 arranged to interact with the corresponding first splines 50 arranged on the ring gear 22 and on the periphery of a projection 52 which is fixedly connected to the transmission housing 12. The first splines 50 on the first axially displaceable coupling sleeve 42 are also arranged to cooperate with corresponding first splines 50 arranged on the input shaft 16. Corresponding first splines 50 disposed on the input shaft 16 are made on the periphery of a first sprocket 46 which is mounted on the shaft 38 of the sun gear 18. However, it is also possible to arrange the first sprocket 46 on the input shaft 16 instead of on the shaft 38 of the sun gear 18. Thus, the first sprocket 46 may be arranged on either side of the splines connection 34. The first splines 50 on the first axially displaceable coupling sleeve 42 are also arranged to cooperate with corresponding first splines 50 arranged on the planet carrier 20. Corresponding first splines 50 disposed on the planet carrier 20 are made on the periphery of a second sprocket 44 which is mounted on the planet carrier 20.

The number of first splines 50 of the first axially displaceable coupling sleeve 42 and input shaft 16 preferably exceeds the number of teeth 32 on the ring gear 22. Thus a large number of discrete locked positions between the ring gear 22 and the first coupling sleeve 42 are obtained, which causes a large number of facets formed on teeth 32 of the gears 18, 22, 24. The facets, however, are close together, so that they together will be experienced as an essentially smooth surface of the teeth 32. The facets therefore do not affect the gearbox 2 function and has no significant effect on the life-span of the gears 18, 22, 24.

The second axially displaceable coupling sleeve 43 is on an inner surface provided with second splines 51 which are arranged to cooperate with corresponding second splines 51 arranged on the ring gear 22, the planet carrier 20 and the output shaft 28. The corresponding second splines 51 arranged on the planet carrier 20 are formed on the periphery of a third sprocket 49 which is mounted on the planet carrier 20. The corresponding second splines 51 provided on the output shaft 28 are formed on the periphery of a fourth sprocket 53 which is mounted on the output shaft 28.

An axial stop 54 arranged on the planet carrier 20 is adapted to abut against the ring gear 22, which axial stop 54 prevents the ring gear 22 to be moved axially. The axial stop 54 may consist of a disc-shaped plate, which by a first thrust bearing 56 is mounted on the planet carrier 20. The axial stop 54 is rotatable relative to the planet carrier 20 and the input shaft 16, and follows the rotation of the ring gear 22. The axial stop 54 fixates the ring gear 22 axially, and leads to that the axial bearing of the input shaft 16 in the gearbox 2 is subjected to less stress when the gears 18, 22, 24 are provided with helical teeth. However, instead of, or in combination with the axial stop 54 a pair of thrust bearings 55 may be arranged on both distal surfaces of the ring gear 22. Thus, the thrust bearings 55 are arranged between the ring gear and the planet carrier 20. A second thrust bearing 57 may be disposed between the shaft 38 of the sun gear 18 and the planet carrier 20 to accommodate axial forces generated in the sun gear 18.

The low gear in the gearbox 2 is obtained by displacing the second coupling sleeve 42, so that the ring gear 22 is connected to the transmission housing 12. The axial displacement of the first and second coupling sleeves 42, 43 are provided with a first and second shift fork 60, 61 arranged in an outside circumferential groove 62 in the respective coupling sleeve 42, 43. The first shift fork 60 is influenced by a first power means 66 and the second shift fork 61 is influenced by a second power means 67. The first and second power means 66, 67 may be a pneumatic or hydraulic cylinder. The shift forks 60, 61 and power means 66, 67 are schematically shown in FIG. 2.

Preferably, the coupling sleeves 42, 43 each has a low weight, which means that there is a need of low energy and force to move the respective coupling sleeves 42, 43 when shifting gears. This allows a quick gear shifting between the different gear positions in the gearbox 2.

Figure 3:
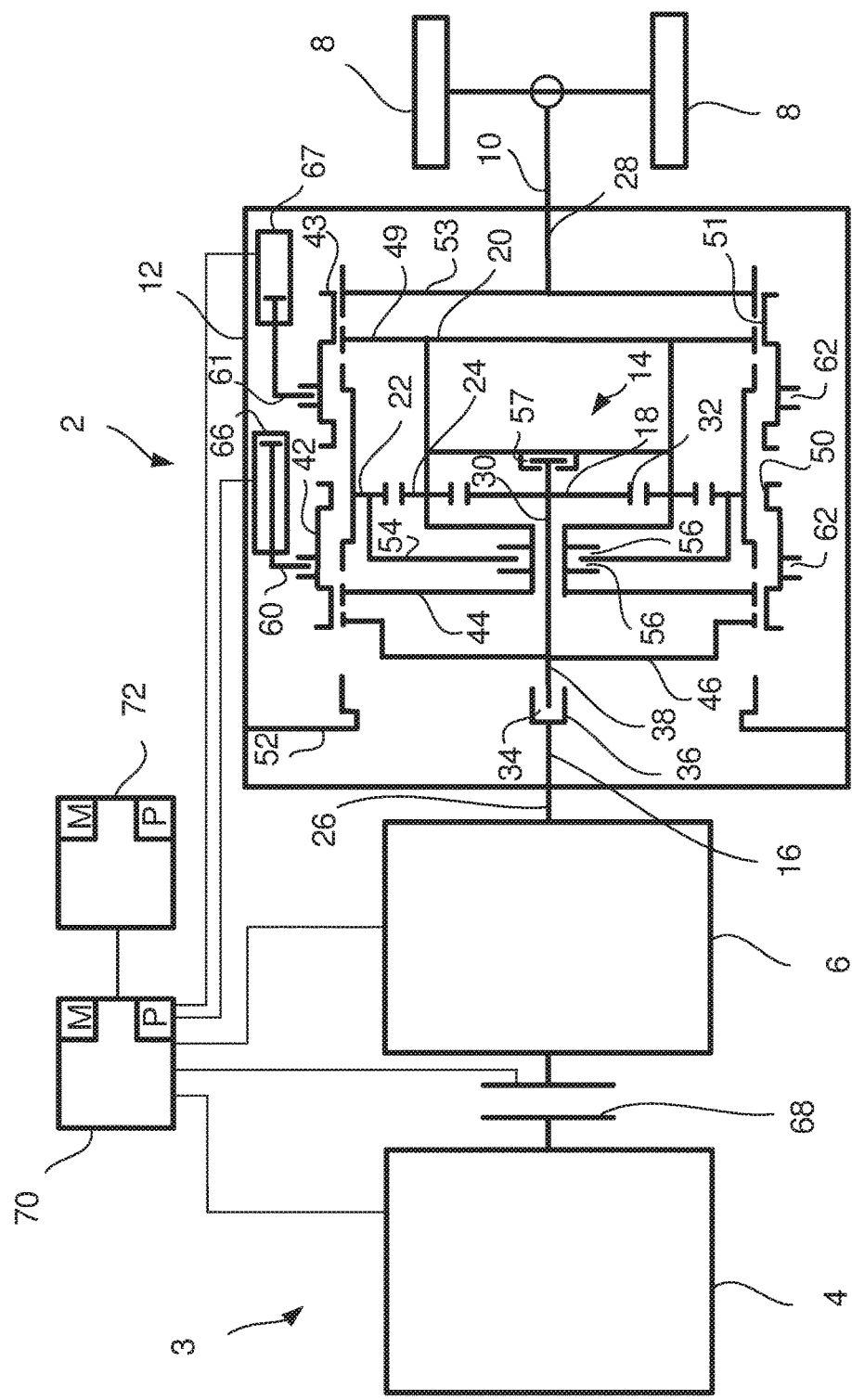
FIG. 3 shows schematically a cross section of the gearbox according to the invention in a high range gear position.

FIG. 3 shows a schematic sectional view of the gearbox 2 according to the invention in the second gear position or high range gear position in which the first coupling sleeve 42 is shifted to the right in FIG. 3 for connecting the input shaft 16 to the planet carrier 20. The second coupling sleeve 42 has in this position disconnected the ring gear 22 of the gearbox housing 12. The transmission of torque from the input shaft 16 to the output shaft 28 is in the high range gear position via the input shaft 16 and planet carrier 20 and further to the output shaft 28 via the second coupling sleeve 43, so that the gear ratio through the planetary gear 14 becomes 1:1. As an alternative, the second axially movable coupling sleeve 43 may in the second gear position be arranged to engage the ring gear 22 with the output shaft 28.

The gearbox 2 according to the invention functions as follows when shifting from the first to the second gear position, that is, from the low range gear position to the high range gear position and to be described in connection with FIGS. 2 and 3. In FIG. 2, the gearbox 2 is shifted into the low range gear position, which means that the first coupling sleeve 42 has been shifted to a position to connect the ring gear 22 with the gearbox housing 12. Thus, when the gearbox 2 is in the low range gear position, a downshift takes place through the planetary gear 14. The shifting operation from the low range gear position to the high range gear position is done by disconnecting the first ring gear 22 from the gearbox housing 12 by means of the first coupling sleeve 42 when the torque transmission between the ring gear 22 and gearbox housing 12 ends, which is accomplished by disconnecting the internal combustion engine 4 from the main gear box 6 through disconnection of a clutch 68. Alternatively, the internal combustion engine 4 is controlled to generate a torque balance between the ring gear 22 and the gearbox housing 12. When the first coupling sleeve 42 no longer transmits any torque the axial displacement of the first coupling sleeve 42 is possible. Thus, the gearbox 2 operates in the high range gear position.

In order to shift gear to the low range gear position, the first coupling sleeve 42 is shifted by the first shift fork 60 in the left direction in FIG. 3 for releasing the planet carrier 20 from the input shaft 16. This is made possible when the torque transmission between the input shaft 16 and planet carrier 20 ends, which is accomplished by disconnecting the internal combustion engine 4 from the main gearbox 6 by means of the coupling 68. Alternatively, the combustion engine 4 is controlled so that torque balance between the input shaft 16 and the planet carrier 20 is generated. When the first coupling sleeve 42 no longer transmits any torque the axial displacement of the first coupling sleeve 40 is possible. The first coupling sleeve 42 is then shifted by the first shift fork 60 in the direction of the gearbox housing 12, to thereby connect the ring gear 22 with the gearbox housing 12. The second coupling sleeve 42 and ring gear 22 must be brought to standstill before connection takes place between the second coupling sleeve 42, the gearbox housing 12 and the ring gear 22. This is achieved by controlling the internal combustion engine 4, so that the input shaft 16 rotates with a speed that is adapted to the speed of the planet carrier 20 and planet gears 24, causing the ring gear 22 to stand still. When the ring gear 22 is stationary, the first coupling sleeve 42 is displaced axially and interferes with the first splines 50 on the ring gear 22 and the gearbox housing 12. Thus, in the low range gear position a downshift occurs through the gearbox 2.

Figure 4:
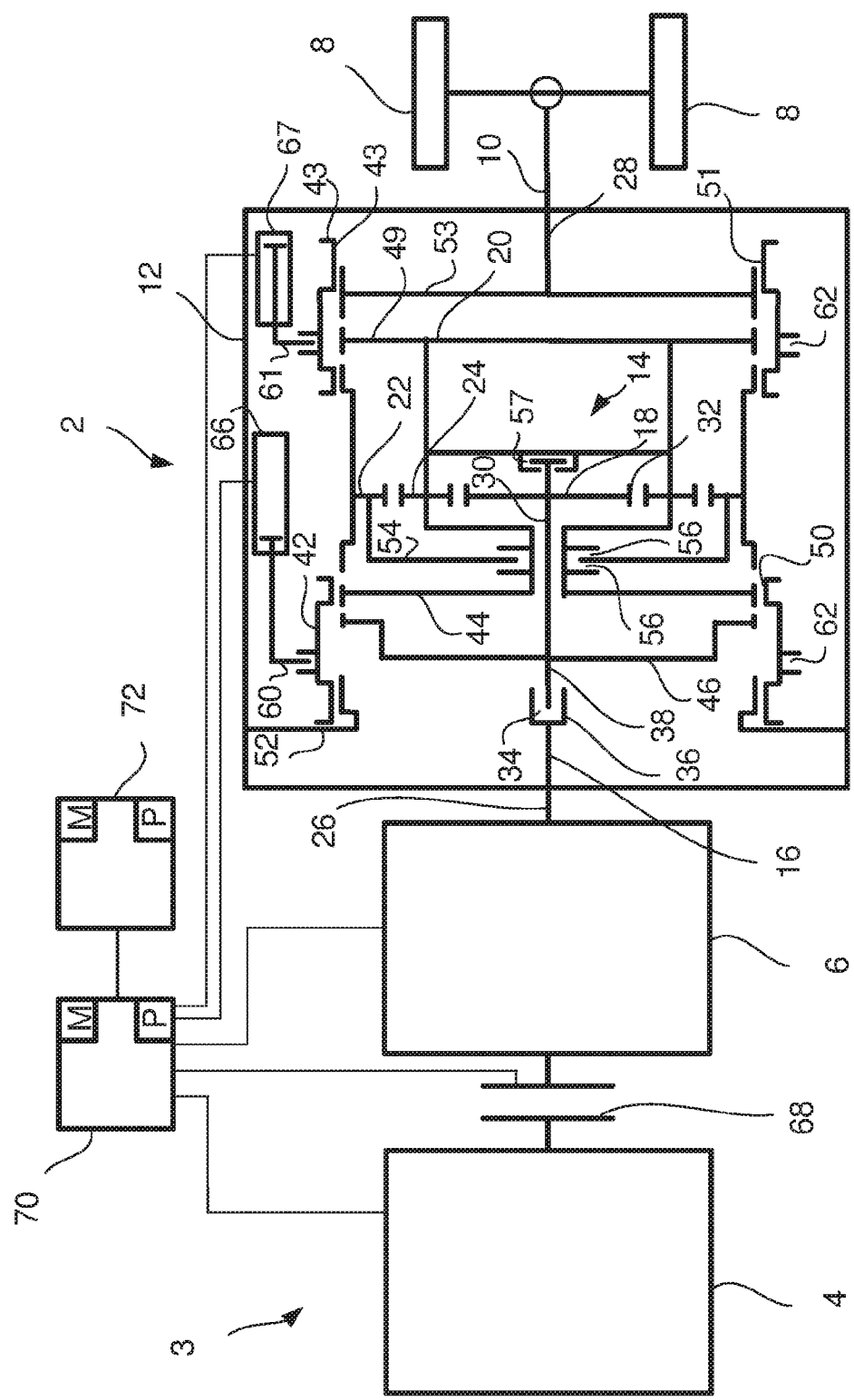
FIG. 4 shows schematically a cross section of the gearbox according to the invention in a reverse position.

In FIG. 4 the gearbox 2 has been shifted into the third gear position, which is the reverse gear. The second axially displaceable sleeve 43 is in the third gear position arranged to connect the ring gear 22 with output shaft 28. Thus, the second coupling sleeve 43 is shifted by the second shift fork 61, so that the ring gear 22 is connected to the output shaft 28. The first coupling sleeve 42 is shifted by the first shift fork 60 to couple the planet carrier 20 with the gearbox housing 12. The displacement of the respective clutch sleeve 42, 43 is performed when the input and the output shaft 16, 28 are stationary, which corresponds to a stationary operating state of the vehicle 1, when the gearbox 2 is included in the transmission 3 of a vehicle 1. In order to provide a stationary position of the input shaft 16 the clutch 68 of the vehicle 1 is transferred to a disconnected mode. When the gearbox 2 is operated in the third gear position, torque is transmitted from the input shaft 16 to the sun gear 18 and further to the planet gears 24 which transmits the torque to the ring gear 22 and further to the output shaft 28 via the second coupling sleeve 43. The planet carrier 20 is stationary as the first coupling sleeve 42 connects the planet carrier 20 with the gearbox housing 12.

Figure 5:
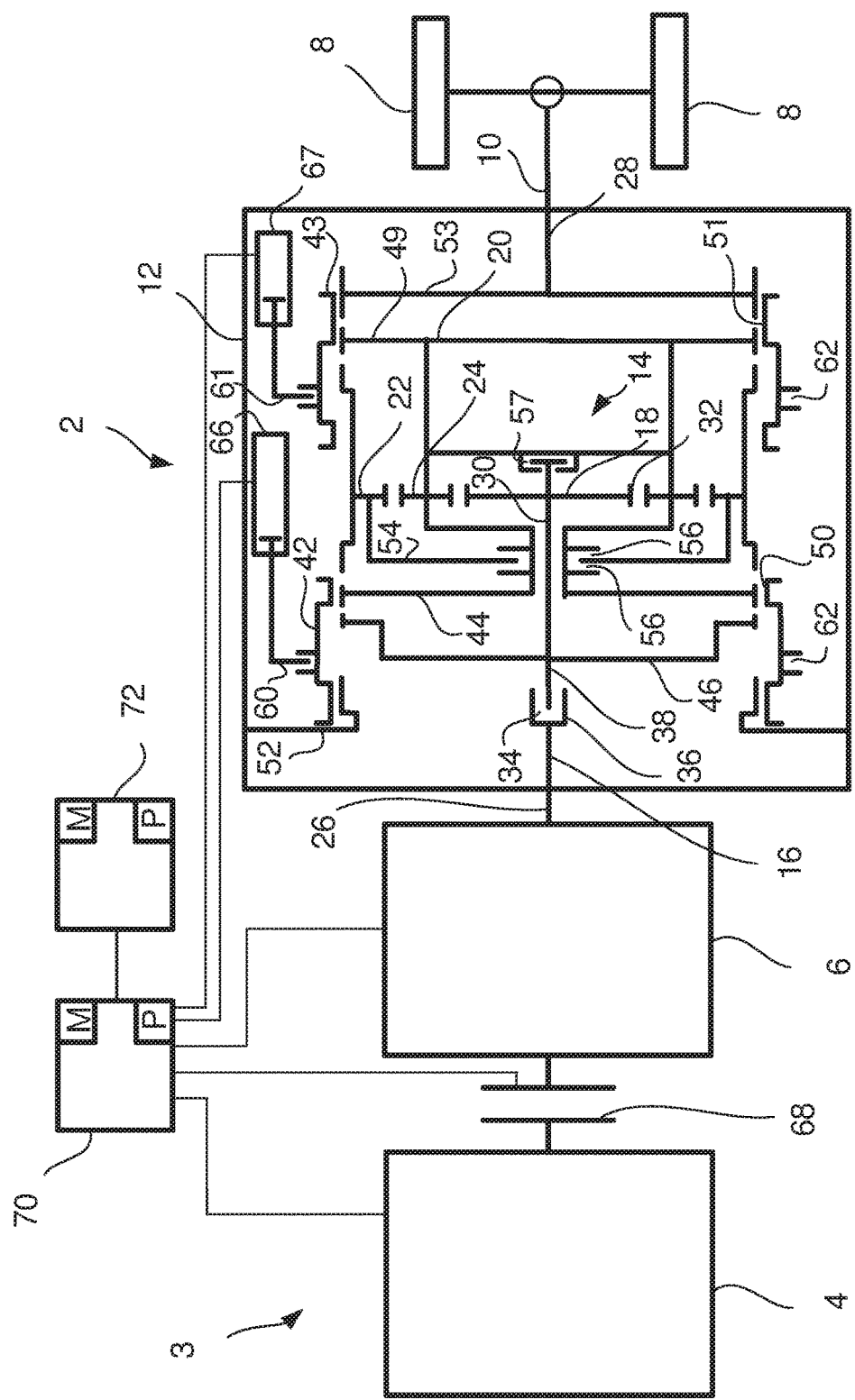
FIG. 5 shows schematically a cross section of the gearbox according to the invention in a parking position.

FIG. 5 shows how the gearbox 2 according to the invention can be brought to a fourth, parking position by displacing the first coupling sleeve 42 to a position where the planet carrier 20 is connected to the transmission housing 12 and when the second coupling sleeve 43 is shifted to a position where the planet carrier 20 is connected to the output shaft 28. Thus, the output shaft 28 is prevented to rotate while the input shaft 16 can rotate in a neutral position, because the input shaft 16 is not connected to the first coupling sleeve 42 in the parking position.

Figure 6:
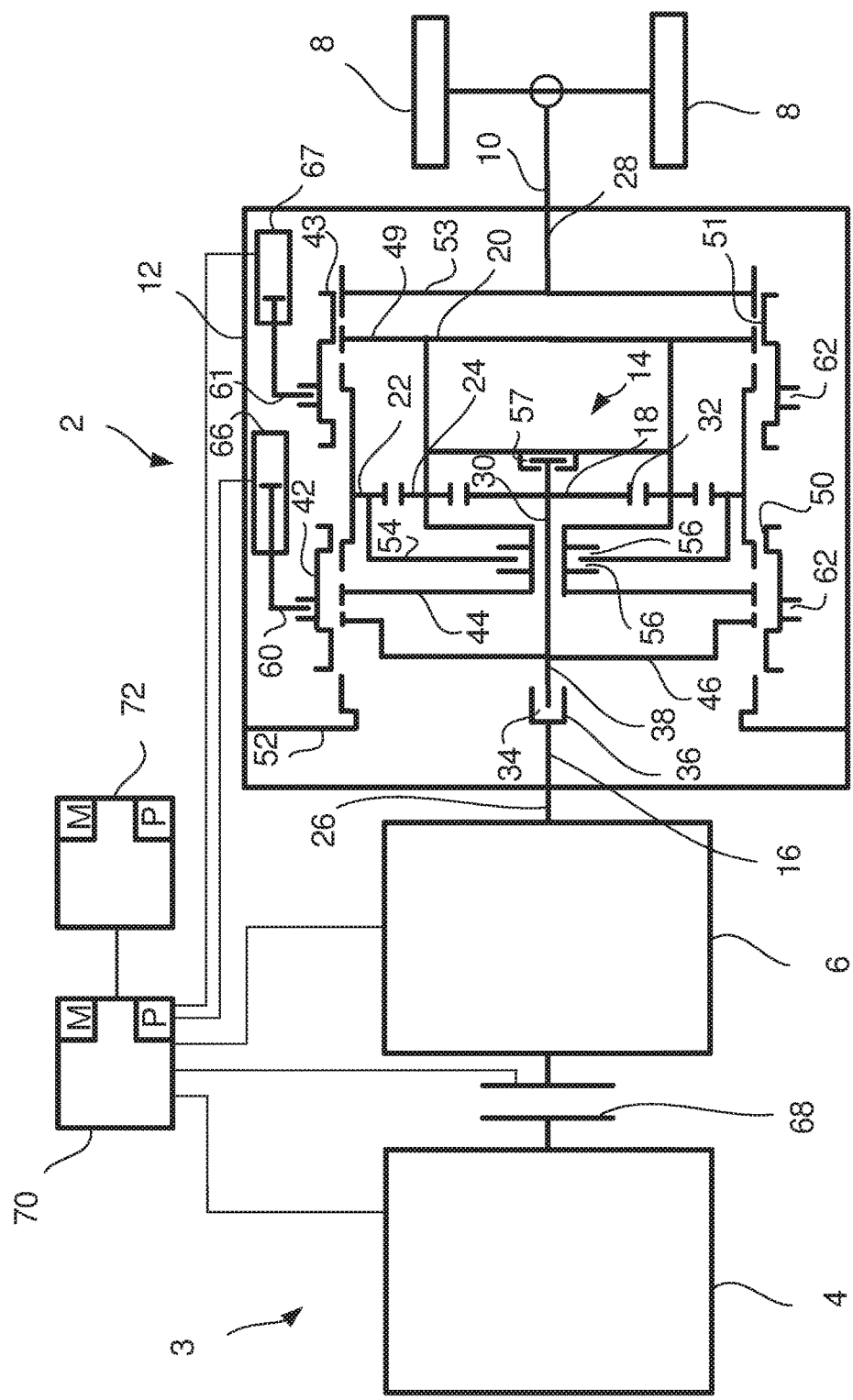
FIG. 6 shows schematically a cross section of the gearbox according to the invention in a neutral position.

FIG. 6 shows how the gearbox 2 according to the invention can be brought to a fifth, neutral position by displacing the first coupling sleeve 42 to a position where the first coupling sleeve 42 only is connected to the ring gear 22. Thus, in the neutral position the sun gear 18, the planet carrier 20 and the ring gear 22 are free to rotate in relation to each other and for that reason the gearbox 2 will not transfer any torque from the input shaft 16 to the output shaft 28. As an alternative the fifth, neutral position may also be achieved by displacing the second coupling sleeve 43 to a position where the second coupling sleeve 43 only is connected to the fourth sprocket 53 which is mounted on the output shaft 28.

When the first coupling sleeve 43 is displaced from the right to left in FIGS. 2-6 the first coupling sleeve 43 will shift the gearbox 2 from the reverse gear position to a low range gear position, thereafter to the neutral position, and further to the high range gear position. The first coupling sleeve 43 is provided with three circular areas. Two areas are contact areas and are provided with the first splines 50. Between the two contact areas a central area is provided which separates the two contact areas from each other.

Figure 7:
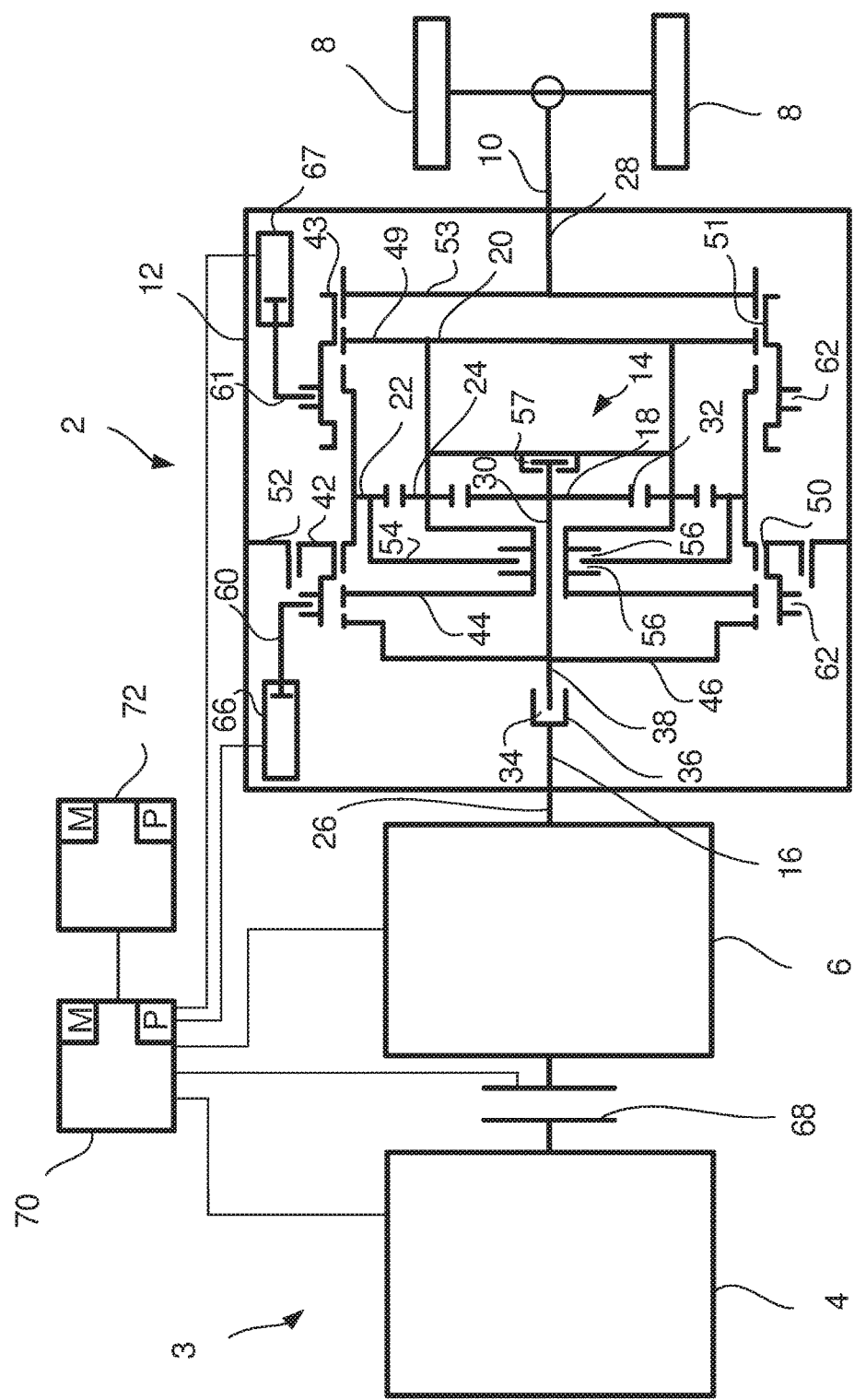
FIGS. 7-9 show an alternative embodiment of the gearbox 2 according to the invention.
Figure 8:
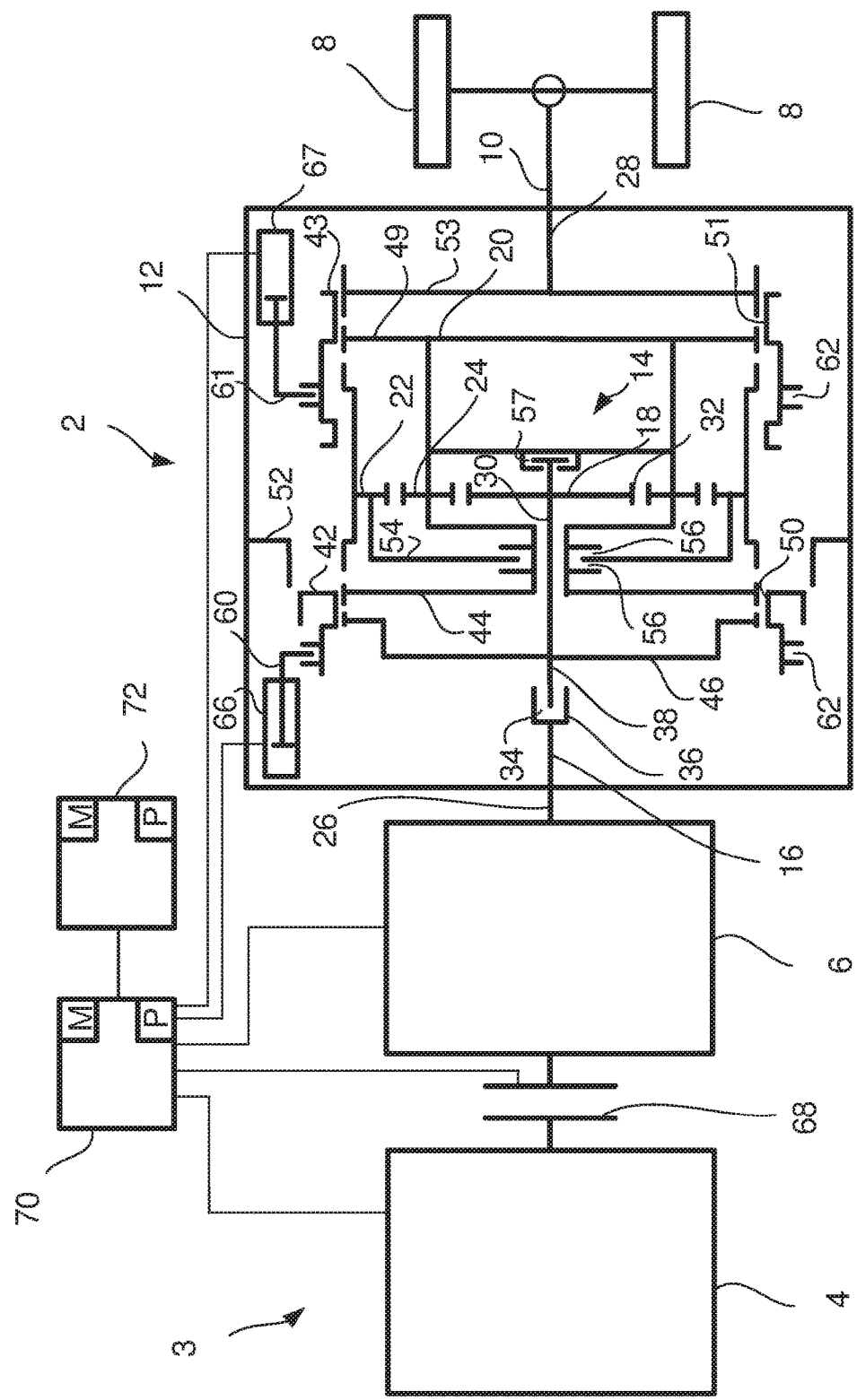
Figure 9:
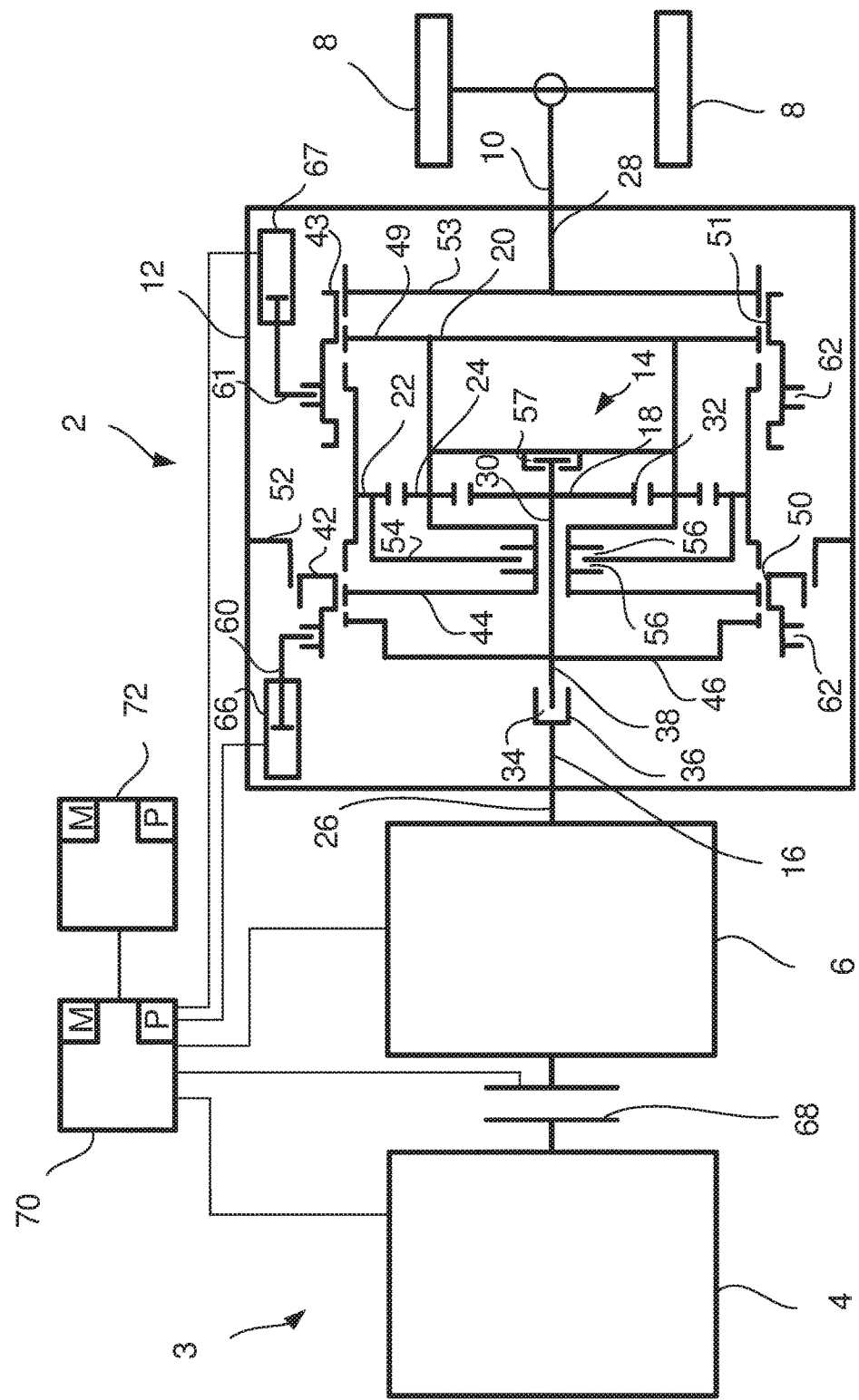

FIGS. 7, 8 and 9 show an alternative embodiment of the gearbox 2 according to the invention. The first coupling sleeve 42 has been rearranged to a shorter design and is provided with first splines 50 on an inner and outer periphery of the sleeve 42. The first splines 50 arranged on the inner periphery of the sleeve 42 interact with corresponding first splines 50 arranged on the input shaft 16. Corresponding first splines 50 disposed on the input shaft 16 are made on the periphery of a first sprocket 46 which is mounted on the input shaft 16. The first splines 50 on the inner periphery of the sleeve 42 are also arranged to cooperate with corresponding first splines 50 arranged on the planet carrier 20. Corresponding first splines 50 disposed on the planet carrier 20 are made on the periphery of a second sprocket 44 which is mounted on the planet carrier 20. The first splines 50 arranged on the outer periphery of the sleeve 42 interact with corresponding first splines 50 arranged on the projection 52 which is fixedly connected to the gearbox housing 12. In FIG. 7 the first coupling sleeve 42 is illustrated in the first position corresponding to a low range gear position. The first coupling sleeve 42 connects the ring gear 22 to the gearbox housing 12. In FIG. 8, the first coupling sleeve 42 has been displaced to the second position corresponding to a high range gear position. The first coupling sleeve 42 connects the sun gear 18 to the planet carrier 20. In FIG. 9, the first coupling sleeve 42 has been displaced to the third position corresponding to reversed gear position. The first coupling sleeve 42 connects planet carrier 20 to the gearbox housing 12.

An electronic control unit 70 is coupled to the transmission 2, the main gearbox 6, the combustion engine 4 and the clutch 68 to achieve the gear shifting above. Preferably, a number of not shown speed sensors in the gearbox 2, in the main gear box 6 and in the internal combustion engine 4 may be connected to the control unit 70. Another computer 72 may also be connected to the control unit 70. The control unit 70 may be a computer with appropriate software for this purpose. The control unit 70 and/or the computer 72 comprise a computer program P, which can include routines to control the gearbox 2 of the present invention. The program P may be stored in an executable form or compressed form in a memory M and/or in a read/write memory. Preferably there is provided a computer program product comprising a program code stored on a, by a computer readable medium for performing the gear shiftings above, when said program is run on the control unit 70 or another computer 72 connected to the control unit 70. Said code may be non-volatile, stored in said computer readable medium.

The above described gearbox 2 is advantageous from a manufacturing and assembling point of view, as the required processing of the components is simple and also the number of parts is small. The design is further such that the space requirement in both axial and radial direction is small. The disclosed gearbox 2 can be used also in other contexts than that described above. Thus it is e.g. possible to use it by hydraulic automatic transmissions where pluralities of gearboxes with planetary gears are coupled to each other.

The components and features specified above may within the framework of the invention be combined between the different embodiments specified.

The invention claimed is:

1. A gearbox for vehicles, comprising:
   a planetary gear with a ring gear,
   a sun gear;
   a planet carrier, on which at least one planet gear is rotatable mounted, which ring gear and sun gear engage with the at least one planet gear by teeth;
   a gearbox housing surrounding the planetary gear;
   a first axially movable coupling sleeve, wherein said first axially movable coupling sleeve in a first gear position is arranged to engage the ring gear with the gearbox housing, in a second gear position is arranged to engage the sun gear with the planet carrier, and in a third gear position is arranged to engage the planet carrier with the gearbox housing; and
   a second axially movable coupling sleeve, wherein said second axially movable coupling sleeve is, in the third gear position, arranged to engage the ring gear with an output shaft.

2. A gearbox according to claim 1, wherein the second axially movable coupling sleeve in the first and second gear positions is arranged to engage the planet carrier with the output shaft.

3. A gearbox according to claim 1, wherein the second axially movable coupling sleeve in the second gear position is arranged to engage the ring gear with the output shaft.

4. A gearbox according to claim 1, wherein an axial abutment means is connected to the ring gear and is rotatable coupled to the planet carrier, which axial abutment means restricts the ring gear from being axially displaced.

5. A gearbox according to claim 1, wherein the first axially movable coupling sleeve in the first gear position is arranged to disengage the sun gear and the planet carrier.

6. A gearbox according to claim 1, wherein the sun gear is connected to an input shaft.

7. A gearbox according to claim 6, wherein the input shaft is connected to the sun gear by means of a splines connection, having an axial elongation which allows an angle displacement between the input shaft and a shaft on which the sun gear is arranged.

8. A gearbox according to claim 7, wherein the planetary gear may be mounted and demounted in one piece on the input shaft by means of the splines connection.

9. A gearbox according to claim 1, wherein the first axially movable coupling sleeve on an inner surface is provided with first splines, which are arranged to cooperate with first splines arranged on the gearbox housing, the sun gear, the planet carrier and the ring gear.

10. A gearbox according to claim 1, wherein the second axially movable coupling sleeve on an inner surface is provided with second splines, which are arranged to cooperate with second splines arranged on the ring gear, the planet carrier and the output shaft.

11. A gearbox according to claim 9, wherein the number of first splines on the first axially movable coupling sleeve and on the sun gear exceed the number of teeth on the ring gear.

12. A gearbox according to claim 1, wherein the teeth of the ring gear, the sun gear and the at least one planet gear are designed as helical teeth which extend in an oblique angle in relation to an axis of rotation of the planetary gear.

13. A gearbox according to claim 1, wherein the gearbox is a range gearbox and in that the input shaft is connected to a main gearbox.

14. A gearbox according to claim 1, wherein the first axially movable coupling sleeve is in a fourth gear position arranged to engage the planet carrier with the gearbox housing; and in that the second axially movable coupling sleeve is in the fourth gear position arranged to engage the planet carrier with the output shaft.

15. A gearbox according to claim 1, wherein the first axially movable coupling sleeve is in a fifth gear position arranged to disengage the planetary gear from the gearbox housing and to disengage the ring gear, the sun gear and the planet carrier from each other.

16. A gearbox according to claim 1, wherein the second axially movable coupling sleeve is in a fifth gear position arranged to disengage the ring gear from the output shaft.

17. A vehicle comprising a gear box, wherein gearbox comprises:
   a planetary gear with a ring gear;
   a sun gear;
   a planet carrier, on which at least one planet gear is rotatable mounted, which ring gear and sun gear engage with the at least one planet gear by teeth;
   a gearbox housing surrounding the planetary gear;
   a first axially movable coupling sleeve, wherein said first axially movable coupling sleeve in a first gear position is arranged to engage the ring gear with the gearbox housing, in a second gear position is arranged to engage the sun gear with the planet carrier, and in a third gear position is arranged to engage the planet carrier with the gearbox housing; and
   a second axially movable coupling sleeve, wherein said second axially movable coupling sleeve is, in the third gear position, arranged to engage the ring gear with an output shaft.

18. A vehicle according to claim 17, wherein the second axially movable coupling sleeve of the gearbox in the first and second gear positions is arranged to engage the planet carrier with the output shaft.

19. A vehicle according to claim 17, wherein the second axially movable coupling sleeve of the gearbox in the second gear position is arranged to engage the ring gear with the output shaft.

20. A vehicle according to claim 17, wherein in the gear box an axial abutment means is connected to the ring gear and is rotatable coupled to the planet carrier, which axial abutment means restricts the ring gear from being axially displaced.

* * * * *